Patented Dec. 26, 1939

2,184,948

UNITED STATES PATENT OFFICE 2,184,948

ACID WOOL DYESTUFFS

Carl Theo Schultis, Bergen, near Frankfort-on-the-Main, and Ernst Korten, Frankfort-on-the-Main-Fechenheim, Germany, assignors to General Aniline Works, Inc., New York, N. Y., a corporation of Delaware No Drawing. Application July 1, 1938, Serial No. 216,964

3 Claims. (Cl. 260—198)

The present invention relates to acid wool dyestuffs, more particularly to those of the general formula:

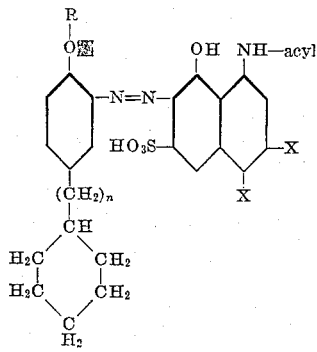

wherein acyl stands for a member selected from the group consisting of aliphatic and aromatic carboxylic and sulfonic acid radicles, R stands for a member selected from the group consisting of lower alkyl radicles and of araliphatic and aromatic radicles of the benzene series, $n$ stands for one of the numbers 1, 2 and 3, one X means hydrogen and the other X a sulfonic acid group.

The new dyestuffs are obtained by combining diazo compounds of amines of the general formula:

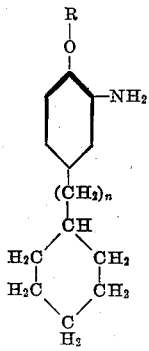

wherein R and $n$ have the aforesaid signification, with acyl derivatives of 1-amino-8-hydroxynaphthalene-3,6- and -4,6-disulfonic acids. The above amines may be prepared, for instance, by condensing cyclohexylcarboxylic acid chloride (or cyclohexyl-acetic- or -propionic acid chloride) with suitable phenol-ethers, nitrating the ketone compounds formed, reducing the nitro group to the amino group and finally reducing the -CO-group to the -CH$_2$-group. If necessary, the amino group may be protected before reducing the -CO-group, by the introduction of an acyl group such as for example the acetyl group, which acyl group is split off by saponification, after the reduction of the -CO-group to the -CH$_2$-group has been performed.

The new dyestuffs dye animal fibers red shades of good fastness properties. They are particularly valuable because of the fact that in the dyeing process of mixed tissues of wool and cotton, the latter is tinged to only a very slight degree.

In order to further illustrate the invention, the following examples are given, the parts being by weight and all temperatures in degrees centigrade.

Example 1

24,7 parts of 3-amino-4-isopropyloxy-hexahydrodiphenylmethane are diazotized in the usual manner and the diazo solution obtained is combined with an aqueous solution of 53 parts of 1-(2',5'-dimethyl-4'-chlorobenzenesulfoamino)-8-hydroxynaphthalene-3,6-disulfonic acid in the presence of an excess of lime. When the combination is complete, the dyestuff formed of the formula:

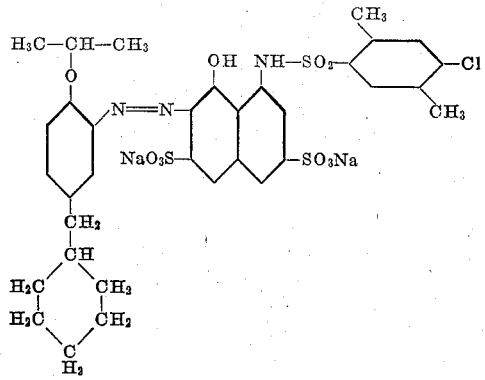

is separated and dried. It is a red powder, soluble in water with a red color and dyeing wool bright bluish red shades of very good fastness properties.

By replacing the above diazo component by the corresponding amounts of the 4-methyl-, -ethyl-, -n-butyl-, -isobutyl-, -benzyl- or phenyl-ether of 3-amino-hexahydrodiphenylmethane, similar red dyestuffs are obtained. Furthermore the analogous ether derivatives of 3-amino-hexahydrodiphenyl-ethane and -propane employed as diazo components also yield valuable dyestuffs, which dye wool bright red shades of good fastness properties.

Example 2

21,9 parts of 3-amino-4-methoxy-hexahydrodiphenylmethane are diazotized and the diazo solution is allowed to run at about 5–10° into an aqueous solution of 40 parts of 1-(2', 4'-dichlorobenzoylamino)-8-hydroxynaphthalene-3, 6-disulfonic acid containing an excess of sodium carbonate. When the combination is complete, the dyestuff formed of the formula:

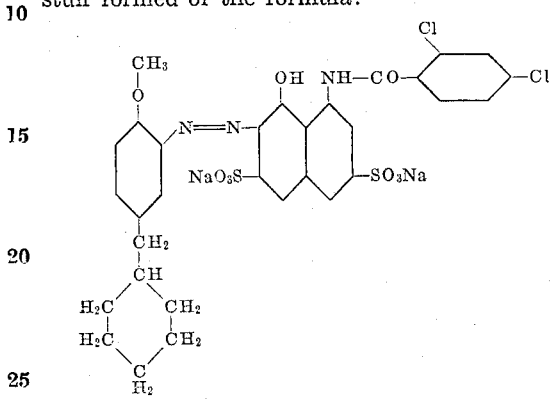

is separated and dried. It is a red powder, soluble in water and dyeing wool bluish red shades of very good fastness properties.

Similar dyestuffs are obtained by employing as coupling component 1-acetylamino-8-hydroxynaphthalene-3,6- or -4,6-disulfonic acid, 1-benzoylamino-8-hydroxynaphthalene-3,6- or -4,6-disulfonic acid, 1-(2'-chlorophenoxyacetylamino)-8-hydroxynaphthalene-3,6- or -4,6-disulfonic acid or 1-benzenesulfoamino-8-hydroxynaphthalene-3,6-disulfonic acid.

We claim:

1. The acid wool dyestuffs of the general formula:

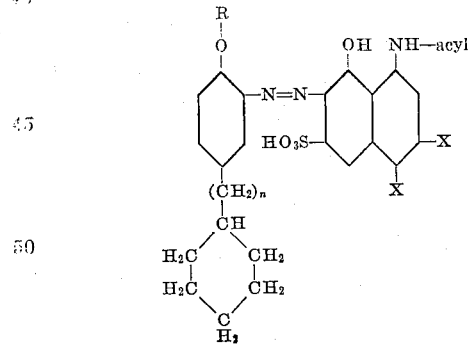

wherein acyl stands for a member selected from the group consisting of aliphatic and aromatic carboxylic and sulfonic acid radicles, R stands for a member selected from the group consisting of lower alkyl radicles and of araliphatic and aromatic radicles of the benzene series, n stands for one of the numbers 1, 2 and 3, one X means hydrogen and the other X a sulfonic acid group, which dyestuffs dye animal fibers red shades of good fastness properties.

2. The dyestuff of the formula:

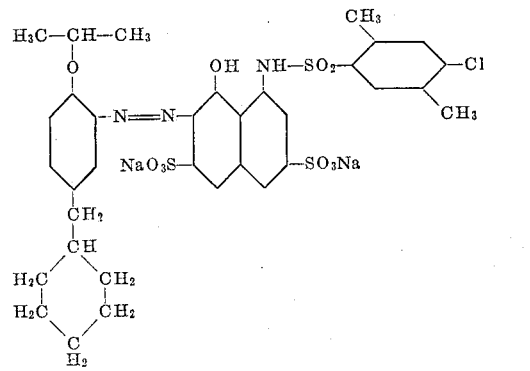

which dyestuff is a red powder, soluble in water and dyeing wool bright bluish red shades of very good fastness properties.

3. The dyestuff of the formula:

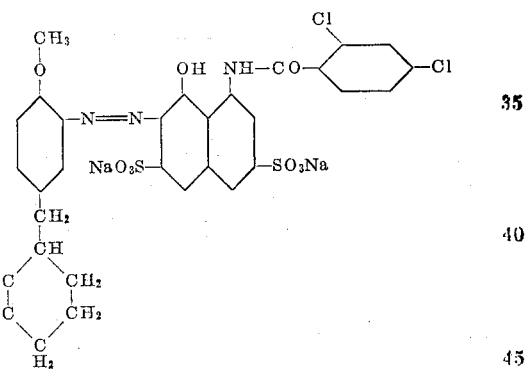

which dyestuff is a red powder, soluble in water and dyeing wool bluish red shades of very good fastness properties.

CARL THEO SCHULTIS.
ERNST KORTEN.